US011413986B2

United States Patent
Kazuno et al.

(10) Patent No.: US 11,413,986 B2
(45) Date of Patent: Aug. 16, 2022

(54) INFORMATION PROVIDING SYSTEM

(71) Applicant: HONDA MOTOR CO., LTD., Tokyo (JP)

(72) Inventors: Shuichi Kazuno, Saitama (JP); Yukiko Onoue, Saitama (JP); Tsubasa Uchida, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 17/182,246

(22) Filed: Feb. 23, 2021

(65) Prior Publication Data

US 2021/0268934 A1 Sep. 2, 2021

(30) Foreign Application Priority Data

Feb. 28, 2020 (JP) .............................. JP2020-033451

(51) Int. Cl.
*B60L 58/18* (2019.01)
*B60L 58/30* (2019.01)
*B60L 58/24* (2019.01)
*B60L 53/80* (2019.01)

(52) U.S. Cl.
CPC .............. *B60L 58/18* (2019.02); *B60L 53/80* (2019.02); *B60L 58/24* (2019.02); *B60L 58/30* (2019.02); *B60L 2240/54* (2013.01); *B60L 2240/662* (2013.01)

(58) Field of Classification Search
None
See application file for complete search history.

(56) References Cited

U.S. PATENT DOCUMENTS

| 2018/0198173 A1* | 7/2018 | Ichikawa ................ B60L 58/12 |
| 2019/0299942 A1* | 10/2019 | Shih ........................ H02J 9/061 |
| 2020/0185929 A1* | 6/2020 | Cooper ............. H02J 13/00032 |
| 2021/0132153 A1* | 5/2021 | Izumi ................... G06N 3/0454 |

FOREIGN PATENT DOCUMENTS

JP 2011217549 A 10/2011

* cited by examiner

*Primary Examiner* — Jared Fureman
*Assistant Examiner* — Joel Barnett
(74) *Attorney, Agent, or Firm* — CKC & Partners Co., LLC

(57) ABSTRACT

Provided is an information providing system capable of promoting reuse of secondary batteries. An information providing system includes a supplementing target device and a server. The supplementing target device includes: a power calculating unit configured to calculate maximum required power; an air temperature acquiring unit configured to acquire past air temperature data; and a supplementing target information requesting unit configured to transmit, to the server, supplementing target information. The server includes: a secondary battery searching unit configured to search for a secondary battery that satisfies the air temperature data and the data of the auxiliary power included in the supplementing target information when receiving the supplementing target information from the supplementing target information requesting unit, and an information transmitting unit configured to transmit secondary battery information relating to the second battery searched by the secondary battery searching unit to the supplementing target device.

4 Claims, 5 Drawing Sheets

FIG. 4

| NAME | LOWEST OPERATING TEMPERATURE | MAXIMUM POWER | STORAGE FACILITY |
|---|---|---|---|
| AAA BATTERY | 10°C | 100kW | AAA |
| BBB BATTERY | −5°C | 350kW | BBB |
| CCC BATTERY | 0°C | 200kW | CCC |
| ... | ... | ... | ... |

FIG. 5

| NAME | LOWEST OPERATING TEMPERATURE | MAXIMUM POWER | PREDICTED POWER FLUCTUATION RANGE | STORAGE FACILITY |
|---|---|---|---|---|
| AAA BATTERY | 10°C | 100kW | 10kW | AAA |
| BBB BATTERY | −5°C | 350kW | 5kW | BBB |
| CCC BATTERY | 0°C | 200kW | 15kW | CCC |
| ... | ... | ... | ... | ... |

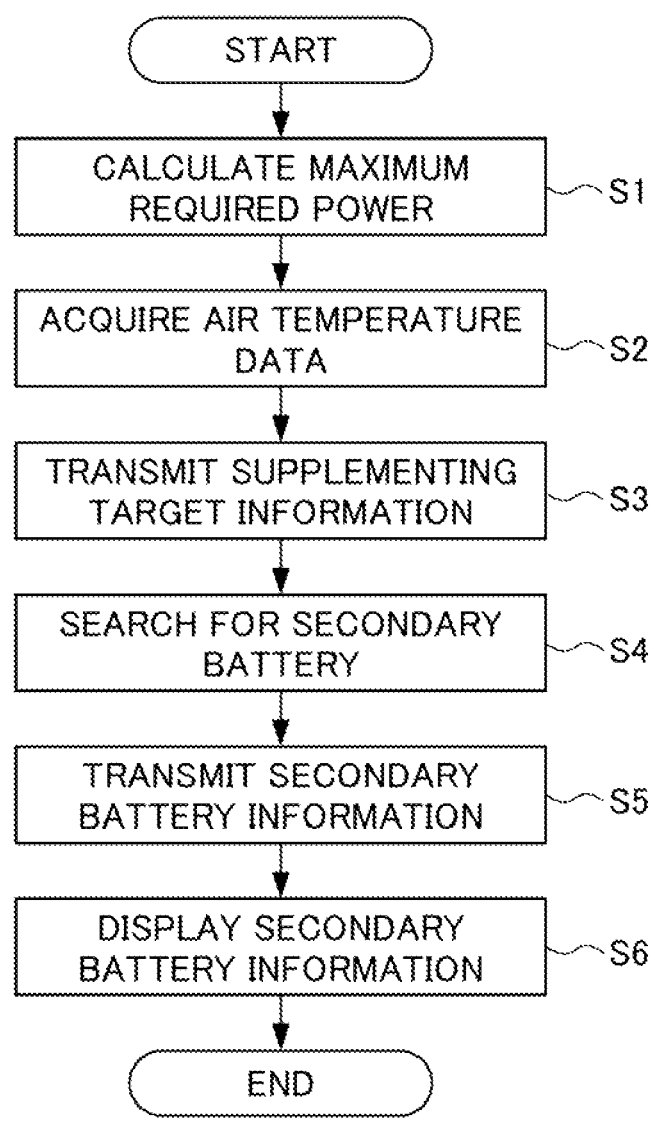

INFORMATION PROVIDING SYSTEM

This application is based on and claims the benefit of priority from Japanese Patent Application No. 2020-033451, filed on 28 Feb. 2020, the content of which is incorporated herein by reference.

BACKGROUND OF THE INVENTION

Field of the Invention

The present invention relates to an information providing system.

Related Art

Conventionally, technology has been proposed for charging a battery in a vehicle equipped with the battery such as an electric vehicle, a hybrid vehicle, a fuel cell vehicle or the like. Japanese Unexamined Patent Application, Publication No. 2011-217549 discloses a battery charging control device in which, when a battery charge amount is equal to or less than a lower limit value of the battery charge amount, charging of the battery by a generator is started, and when the battery charge amount is equal to or more than the upper limit value of the battery charge amount, charging of the battery by the generator is stopped.

Patent Document 1: Japanese Unexamined Patent Application, Publication No. 2011-217549

SUMMARY OF THE INVENTION

In recent years, it has been proposed to introduce a secondary battery such as the battery mentioned above, stationary fuel cells, and the like into urban areas, and effectively use such secondary batteries by reusing secondary batteries capable of supplying power. However, it has been difficult to effectively perform the reuse of secondary batteries by matching a vehicle or the like desired to receive the supply of power from the secondary battery, and a secondary battery capable of supplying power.

It is, therefore, an object of the present invention to provide an information providing system capable of promoting reuse of secondary batteries.

An information providing system (for example, an information providing system 1 described below) according to an aspect of the present invention is an information providing system including an supplementing target device (for example, an supplementing target device 10 described below) configured to receive supply of power, and a server (for example, a server 20) configured to provide information for supplying power to the supplementing target device, in which the supplementing target device includes: a power calculating unit (for example, a power calculating unit 111 described below) configured to calculate maximum required power of a peripheral device of the supplementing target device; an air temperature acquiring unit (for example, an air temperature acquiring unit 112 described below) configured to acquire past air temperature data at an installation position of the supplementing target device; and an supplementing target information requesting unit (for example, an supplementing target information requesting unit 114 described below) configured to transmit, to the server, supplementing target information including data of auxiliary power capable of supplementing the maximum required power of the peripheral device and the air temperature data, and in which the server includes a secondary battery searching unit (for example, a secondary battery searching unit 211 described below) configured to search for a secondary battery that satisfies the air temperature data and the data of the auxiliary power included in the supplementing target information when receiving the supplementing target information from the supplementing target information requesting unit, and an information transmitting unit (for example, an information transmitting unit 212 described below) configured to transmit secondary battery information relating to the second battery searched by the secondary battery searching unit to the supplementing target device.

Furthermore, the supplementing target device further includes: an allowable range calculating unit (for example, an allowable range calculating unit 113 described below) configured to calculate, as an allowable range of an output fluctuation of the secondary battery, a predicted power fluctuation range when the secondary battery supplements a load fluctuation allowable fluctuation range of the supplementing target device, in which the supplementing target information includes the predicted power fluctuation range calculated by the allowable range calculating unit.

Furthermore, the supplementing target device includes a fuel cell vehicle, an electric vehicle, a solar power generation vehicle, a stationary fuel cell, a stationary solar battery, or a stationary secondary battery.

Furthermore, the air temperature data include at least one of low temperature data or high temperature data.

According to the present invention, it is possible to provide an information providing system capable of promoting reuse of secondary batteries.

BRIEF DESCRIPTION OF THE DRAWINGS

FIG. 4 is a table showing an example of secondary battery information;

FIG. 5 is a table showing another example of the secondary battery information; and FIG. 6 is a flowchart showing processing of the information providing system.

DETAILED DESCRIPTION OF THE INVENTION

Figure 1:
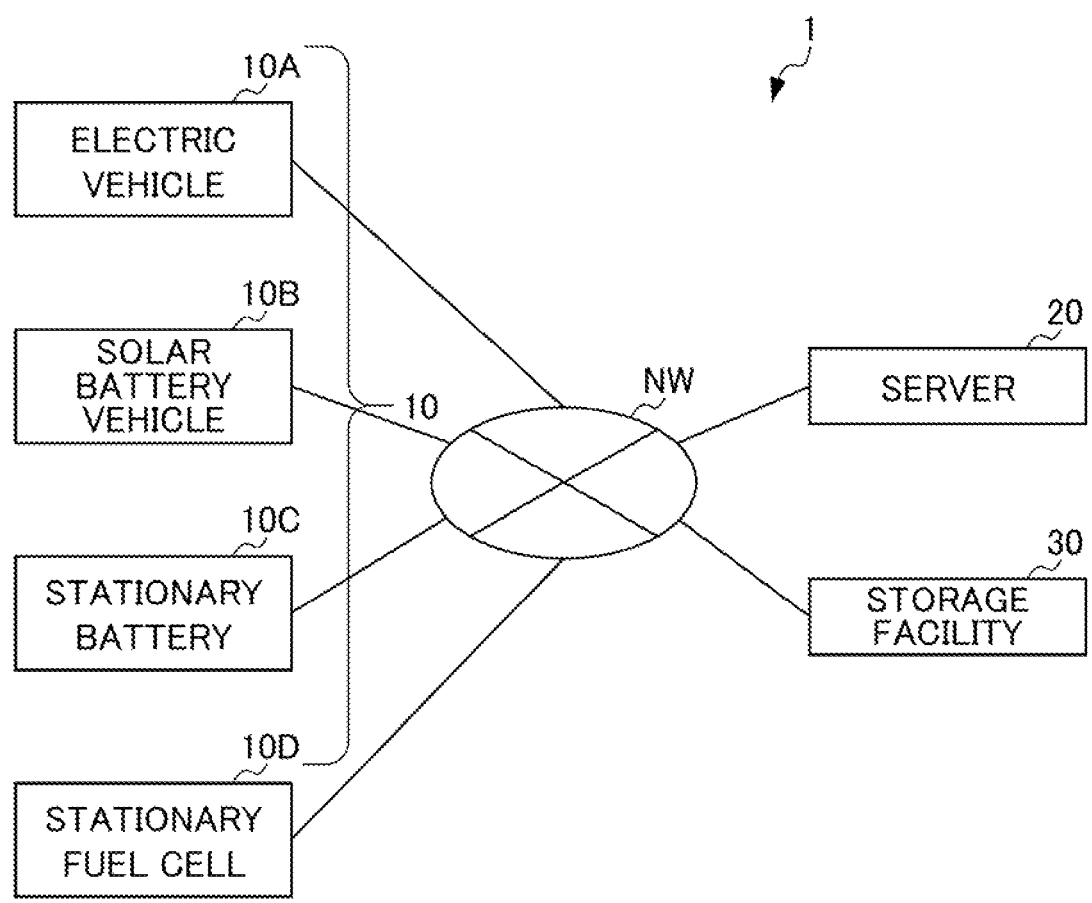
FIG. 1 is a diagram showing an example of a configuration of an information providing system according to the present embodiment.

Embodiments of an information providing system of the present invention will be described below with reference to the drawings. FIG. 1 is a diagram showing an example of the configuration of an information providing system 1 according to the present embodiment. As shown in FIG. 1, the information providing system 1 includes an electric vehicle 10A, a solar battery vehicle 10B, a stationary battery 10C, a stationary fuel cell 10D, a server 20, and a storage facility 30.

The electric vehicle 10A, the solar battery vehicle 10B, the stationary battery 10C, and the stationary fuel cell 10D ace collectively referred to as a supplementing target device 10. It should be noted that the supplementing target device 10 may be a device having a secondary battery such as a battery other than the configuration described above, and thus, may be, for example, a fuel ceil vehicle, a stationary solar battery, or the like. In the present embodiment, the supplementing target device 10 reuses a secondary battery stored in the storage facility 30 to supplement the power.

The server 20 is communicably connected to the supplementing target device 10 and the storage facility 30 via a network NW. The storage facility 30 is a facility for storing to reuse a secondary battery such as a battery. The storage facility 30 has information relating to the stored secondary battery, and is connected to the network NW.

Figure 2:
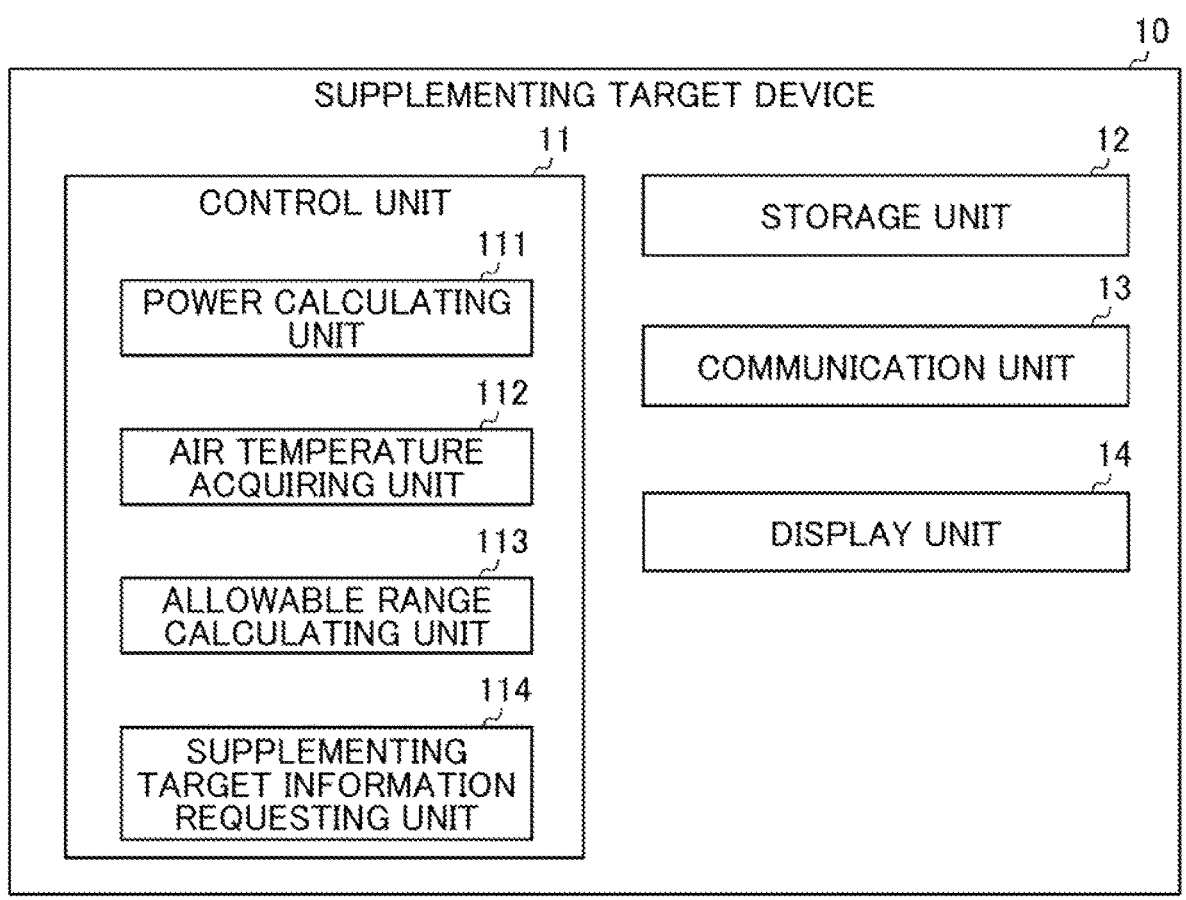
FIG. 2 is a diagram showing an example of a configuration of a supplementing target device.

FIG. 2 is a diagram showing an example of the configuration of the supplementing target device 10. As shown in FIG. 2, the supplementing target device 10 includes a control unit 11, a storage unit 12, a communication unit 13 and a display unit 14. The control unit 11 is, for example, realized by a hardware processor such as a CPU (Central Processing Unit) executing a program (software). Some or all of these constituent elements may be realized by hardware (including a circuit unit or circuitry) such as LSI (Large Scale Integration), ASIC (Application Specific Integrated Circuit), FPGA (Field-Programmable Gate Array), or GPU (Graphics Processing Unit), or may be realized by cooperation of software and hardware. The program may be stored in advance in a storage device (a storage device including a non-transient storage medium) such as an HDD (Hard Disk Drive) or flash memory, or may be stored in a removable storage medium (a non-transient storage medium) such as DVD or CD-ROM, and installed by mounting the storage medium on the drive device.

The storage unit 12 is realized by, for example, a storage device including a non-transient storage medium such as an HDD (Hard Disk Drive), flash memory, EEPROM (Electrically Erasable Programmable Read Only Memory), and ROM (Read Only Memory), or RAM (Random Access Memory).

The communication unit 13 is a communication interface for communicating with an external device such as a server 20 through the network NW. The display unit 14 is a device for displaying an image. The display unit 14 is, for example, an LCD (Liquid Crystal Display), an organic EL (Electroluminescence), or the like.

Figure 3:
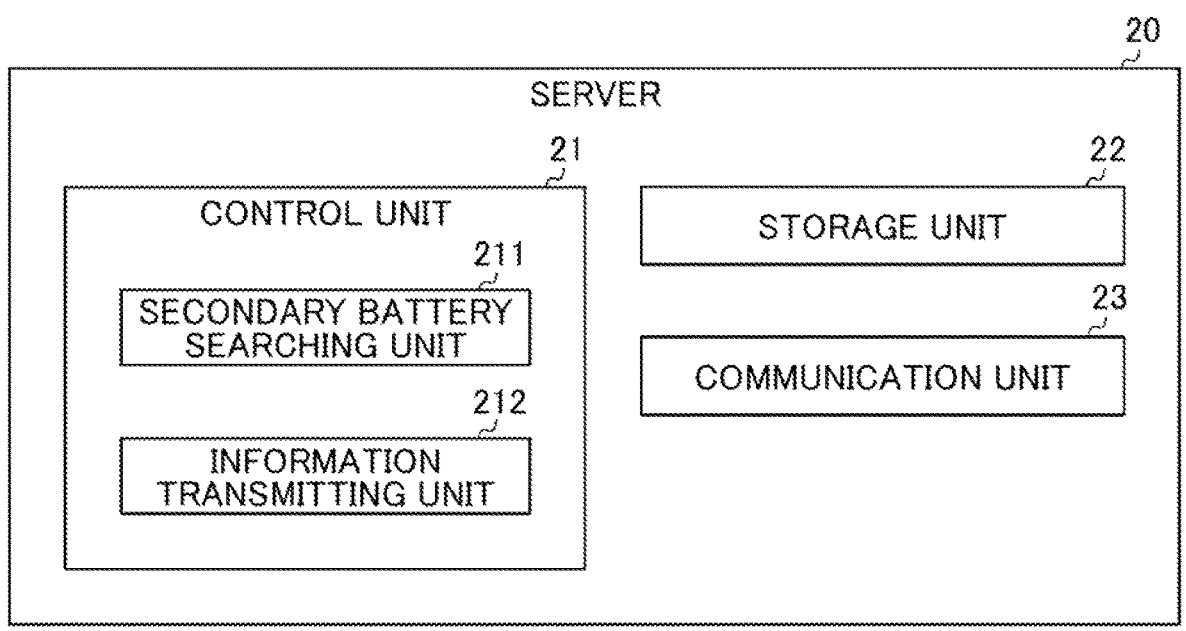
FIG. 3 is a diagram showing an example of a configuration of a server.

Next, the processing of the control unit 11 will be described. As shown in FIG. 3, the control unit 11 includes a power calculating unit 111, an air temperature acquiring unit 112, an allowable range calculating unit 113, and a supplementing target information requesting unit 114. The power calculating unit 111 calculates the maximum required power of a peripheral device such as an air pump and auxiliary equipment of the supplementing target device 10.

The air temperature acquiring unit 112 acquires past, air temperature data at the installation position of the supplementing target device 10. More specifically, the air temperature acquiring unit 112 accesses a database or the like storing past, air temperature information via the network NW, and acquires the past air temperature data at the installation position of the supplementing target device 10. Here, the air temperature data includes at least one of low temperature data and high temperature data. The low temperature data may be the lowest air temperature, the annual lowest air temperature range estimated from the lowest air temperature of each month, etc. The high temperature data may be the highest air temperature, the annual highest air temperature range estimated from the highest air temperature of each month, etc.

Furthermore, the air temperature acquiring unit 112 may estimate the temperature range in which the supplementing target device 10 is used from the trend of the past air temperature data (for example, the average air temperature is increased by 1° C. every year), and may use the estimated air temperature range as the air temperature data.

Furthermore, a fuel cell, a lithium-ion battery, or the like constituting the secondary battery has a characteristic in that the performance is likely to deteriorate at low and high temperatures. Therefore, when using the supplementing target device 10 in a cold region, for example, the air temperature acquiring unit 112 may use low temperature data as the air temperature data without considering the high temperature data. Furthermore, when using the supplementing target device 10 in a tropical region, for example, the air temperature acquiring unit 112 may use high temperature data as the air temperature data without considering the low temperature data. Furthermore, when the supplementing target device 10 is used in an area where the air temperature difference is large throughout the year, the air temperature acquiring unit 112 may use both the high temperature data and the low temperature data as the air temperature data.

The allowable range calculating unit 113 calculates a predicted power fluctuation range when the secondary battery supplements a load fluctuation allowable fluctuation range of the supplementing target device 10, as an allowable range of the output fluctuation of the secondary battery. More specifically, the allowable range calculating unit 113 calculates a predicted power fluctuation range (e.g., ±6 kWΔ seconds) when the secondary battery supplements a load fluctuation allowable fluctuation range of the supplementing target device 10 (e.g., ±5 kWΔ seconds), as an allowable range of the output fluctuation of the secondary battery. Here, in the predicted power fluctuation range, a predetermined value In consideration of loss such as charge and discharge loss of the secondary battery (e.g., 1 kW) is added to the load fluctuation allowable fluctuation range. Therefore, the predicted power fluctuation range becomes a value larger than the load fluctuation allowable fluctuation range.

The supplementing target information requesting unit 114 generates supplementing target information including data of the auxiliary power capable of supplementing the maximum required power of a peripheral device such as an air pump or auxiliary equipment of the supplementing target device 10 by the secondary battery, and the air temperature data acquired by the air temperature acquiring unit 112, and transmits the supplementing target information to the server 20. Here, the supplementing target information may include the predicted power fluctuation range calculated by the allowable range calculating unit 113, together with the auxiliary power and the lowest temperature. By using the predicted power fluctuation range in this way, it is possible to improve the accuracy in searching for a secondary battery.

FIG. 3 is a diagram showing an example of the configuration of the server 20. As shown in FIG. 3, the server 20 includes a control unit 21, a storage unit 22, and a communication unit 23. Various functions of the control unit 21 are realized, for example, by a processor such as a CPU executing a program (software) stored in a storage device. Some or all of these functional units may be realized by hardware such as LSI ASIC, or FPGA, or may be realized by cooperation of software and hardware.

The storage unit 22 is realized by, for example, a storage device including a non-transient storage medium such as an HDD, flash memory, EE PROM, ROM, or the like, or HAM or the like. The communication unit 23 is a communication interface for communicating with another device via the network NW.

The control unit 21 includes a secondary battery searching unit 211 and an information transmitting unit 212. When receiving the supplementing target information from the supplementing target information requesting unit 114 of the supplementing target, device 10, the secondary battery searching unit 211 searches for the secondary battery that satisfies the air temperature data and the data of the auxiliary power included in the supplementing target information based on the supplementing target information. More specifically, the storage unit 22 stores in advance the secondary battery information relating to the secondary batteries stored in the storage facility 30. The secondary battery information relating to the secondary battery is, for example, associated with the lowest operating air temperature at which the secondary battery is suitably operable and the maximum power of the secondary battery.

FIG. 4 is a table showing an example of secondary battery information. As shown in FIG. 4, the storage unit 22 stores, as the secondary battery information, the name of the secondary battery, the lowest operating air temperature, the maximum power, and the location of the storage facility where the secondary battery is stored in association with each other. It should be noted that the example of FIG. 4 uses the lowest air temperature as an example of the air temperature data. Furthermore, the secondary battery searching unit 211 searches for a secondary battery that satisfies the lowest air temperature and the auxiliary power included in the supplementing target information from the secondary battery information stored in the storage unit 22.

Furthermore, the secondary battery searching unit 211 may search for a secondary battery that satisfies the predicted power fluctuation range in addition to the lowest air temperature and the auxiliary power. FIG. 5 is a table showing another example of the secondary battery information. As shown in FIG. 5, the storage unit 22 stores, as the secondary battery information, the name of the secondary battery, the lowest operating air temperature of the secondary battery, the maximum power of the secondary battery, the predicted power fluctuation range of the secondary battery, and the location of the storage facility where the secondary battery is stored in association with each other. Furthermore, the secondary battery searching unit 211 may search for the secondary battery that satisfies the lowest air temperature, the auxiliary power, and the predicted power fluctuation range included in the supplementing target information from the secondary battery information stored in the storage unit 22. In the example of FIG. 5, the lowest air temperature is used as an example of the air temperature data.

The information transmitting unit 212 transmits the secondary battery information relating to the secondary battery searched by the secondary battery searching unit 211 to the supplementing target device 10. It should be noted that, when there is a plurality of secondary batteries searched by the secondary battery searching unit 211, the Information transmitting unit 212 may transmit the secondary battery information relating to all the secondary batteries searched or, for example, transmit the secondary battery information relating to a secondary battery having the maximum power value.

FIG. 6 is a flowchart showing processing of the information providing system 1. In Step S1, the power calculating unit 111 calculates the maximum required power of the peripheral device of the supplementing target device 10. In Step 32, the air temperature acquiring unit 112 acquires the past air temperature data at the installation position of the supplementing target device 10.

In Step S3, the supplementing target information requesting unit 114 generates the supplementing target information including data of the auxiliary power capable of supplementing the maximum required power of the peripheral device of the supplementing target device 10 by the secondary battery and the air temperature data acquired by the air temperature acquiring unit 112, and transmits the supplementing target information to the server 20. Furthermore, the supplementing target information may also include a predicted power fluctuation range calculated by the allowable range calculating unit 113, together with the auxiliary power and the lowest air temperature.

In Step S4, when the secondary battery searching unit 211 receives the supplementing target information from the supplementing target information requesting unit 114 of the supplementing target device 10, the secondary battery searching unit 211 searches for a secondary battery that satisfies the air temperature data and the data of the auxiliary power included in the supplementing target Information baaed on the supplementing target information.

In Step S5, the information transmitting unit 212 transmits the secondary battery information relating to the secondary battery searched by the secondary battery searching unit 211 to the supplementing target device 10. In Step S6, the control unit 11 of the supplementing target device 10 receives the secondary battery information, and displays the secondary battery information on the display unit 14.

According to the present embodiment, the following effects can be achieved, for example. The information providing system 1 includes a supplementing target device 10 configured to receive a supply of power, and a server 20 configured to provide information for supplying power to the supplementing target device 10. The supplementing target device 10 includes: a power calculating unit 111 configured to calculate maximum required power of a peripheral device of the supplementing target device 10; an air temperature acquiring unit 112 configured to acquire past air temperature data at an installation position of the supplementing target device 10; and an supplementing target information requesting unit 114 configured to transmit, to the server 20, supplementing target information including data of auxiliary power capable of supplementing the maximum required power of the peripheral device and the air temperature data. The server 20 includes: a secondary battery searching unit 211 configured to search for a secondary battery that satisfies the air temperature data and the data of the auxiliary power included in the supplementing target, information when receiving the supplementing target information from the supplementing target information requesting unit 114, and an information transmitting unit 212 configured to transmit secondary battery information relating to the second battery searched by the secondary battery searching unit 211 to the supplementing target device 10.

With such a configuration, since it is possible for the information providing system 1 to obtain the secondary battery information relating to the secondary battery usable by the supplementing target device 10, it is possible to match the secondary battery capable of supplying power and the supplementing target device 10 desired to receive supplement of power, thereby making it possible to promote reuse of secondary batteries.

Furthermore, the supplementing target device 10 further includes: an allowable range calculating unit 113 configured to calculate, as an allowable range of an output fluctuation of the secondary battery, a predicted power fluctuation range when the secondary battery supplements a load fluctuation allowable fluctuation range of the supplementing target device 10, in which the supplementing target information includes the predicted power fluctuation range calculated by the allowable range calculating unit 113. With such a configuration, since the information providing system 1 searches for a secondary battery using the supplementing target information including the predicted power fluctuation range, it is possible to search for the secondary battery suitable for the supplementing target device 10 with higher accuracy.

Furthermore, the supplementing target device 10 includes a fuel cell vehicle, an electric vehicle, a solar power generation vehicle, a stationary fuel cell, a stationary solar battery, or a stationary secondary battery. With such a configuration, it is possible for the information providing system 1 to match a secondary battery capable of supplying power to various types of supplementing target devices 10 to thereby promote reuse of secondary batteries.

While an embodiment of the present invention has been described above, the present invention is not limited thereto. The configuration of detailed parts may be changed as appropriate within the spirit of the present invention.

EXPLANATION OF REFERENCE NUMERALS

1 Information providing system
10 supplementing target, device
11 control unit
12 storage unit
13 communication unit
14 display unit
20 server
30 storage facility
111 power calculating unit
112 air temperature acquiring unit
113 allowable range calculating unit
114 supplementing target, information requesting unit
211 secondary battery searching unit
212 information transmitting unit

What is claimed is:

1. An information providing system comprising a supplementing target device configured to receive a supply of power, and a server configured to provide information for supplying power to the supplementing target device,
    wherein the supplementing target device comprises:
    a power calculating unit configured to calculate maximum required power of a peripheral device of the supplementing target device;
    an air temperature acquiring unit configured to acquire past air temperature data at an installation position of the supplementing target device; and
    a supplementing target information requesting unit configured to transmit, to the server, supplementing target information including data of auxiliary power capable of supplementing the maximum required power of the peripheral device, and the air temperature data, and
    wherein the server comprises:
    a secondary battery searching unit configured to search for a secondary battery that satisfies the air temperature data and the data of the auxiliary power included in the supplementing target information when receiving the supplementing target information from the supplementing target information requesting unit, and
    an information transmitting unit configured to transmit secondary battery information relating to the second battery searched by the secondary battery searching unit to the supplementing target device.

2. The information providing system according to claim 1, wherein the supplementing target device further comprises:
    an allowable range calculating unit configured to calculate, as an allowable range of an output fluctuation of the secondary battery, a predicted power fluctuation range when the secondary battery supplements a load fluctuation allowable fluctuation range of the supplementing target device,
    wherein the supplementing target information includes the predicted power fluctuation range calculated by the allowable range calculating unit.

3. The information providing system according to claim 1, wherein the supplementing target device includes a fuel cell vehicle, an electric vehicle, a solar power generation vehicle, a stationary fuel ceil, a stationary solar battery, or a stationary secondary battery.

4. The information providing system according to claim 1, wherein the air temperature data includes at least one of low temperature data and high temperature data.

* * * * *